United States Patent
Muchherla et al.

(10) Patent No.: US 12,131,020 B2
(45) Date of Patent: *Oct. 29, 2024

(54) MEMORY DEVICES AND SYSTEMS INCLUDING STATIC AND DYNAMIC CACHES, AND RELATED METHODS

(71) Applicant: Micron Technology, Inc., Boise, ID (US)

(72) Inventors: Kishore K. Muchherla, Fremont, CA (US); Ashutosh Malshe, Fremont, CA (US); Sampath K. Ratnam, Boise, ID (US); Peter Feeley, Boise, ID (US); Michael G. Miller, Boise, ID (US); Christopher S. Hale, Boise, ID (US); Renato C. Padilla, Folsom, VA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,615

(22) Filed: Dec. 3, 2021

(65) Prior Publication Data
US 2022/0091740 A1 Mar. 24, 2022

Related U.S. Application Data

(63) Continuation of application No. 16/396,432, filed on Apr. 26, 2019, now Pat. No. 11,204,696, which is a
(Continued)

(51) Int. Cl.
*G06F 3/06* (2006.01)
*G06F 11/34* (2006.01)
(Continued)

(52) U.S. Cl.
CPC ............ *G06F 3/0604* (2013.01); *G06F 3/064* (2013.01); *G06F 3/0653* (2013.01);
(Continued)

(58) Field of Classification Search
CPC ...... G06F 3/0604; G06F 3/064; G06F 3/0853; G06F 3/0679; G06F 11/34; G06F 11/348;
(Continued)

(56) References Cited

U.S. PATENT DOCUMENTS 8,886,911 B2 * 11/2014 Nemazie ............. G06F 12/0815
711/171
8,984,216 B2 3/2015 Fillingim
(Continued)

FOREIGN PATENT DOCUMENTS

CN 102597910 A 3/2015
CN 103562883 A 5/2016
(Continued)

OTHER PUBLICATIONS

Communication under Rule 71(3) EPC for European Application No. 17851296.8, dated Dec. 23, 2021, 6 pages.
(Continued)

*Primary Examiner* — Tuan V Thai
(74) *Attorney, Agent, or Firm* — TraskBritt (57) ABSTRACT

Memory devices are disclosed. A memory device may include dynamic cache, static cache, and a memory controller. The memory controller may be configured to disable the static cache responsive to a number of program/erase (PE) cycles consumed by the static cache being greater than an endurance of the static cache. The memory controller may also be configured to disable the dynamic cache responsive to a number of PE cycles consumed by the dynamic cache being greater than an endurance of the dynamic cache. Associated methods and systems are also disclosed.

19 Claims, 8 Drawing Sheets

Related U.S. Application Data continuation of application No. 15/269,518, filed on Sep. 19, 2016, now Pat. No. 10,359,933.

(51) Int. Cl.
    *G06F 12/02* (2006.01)
    *G06F 12/0888* (2016.01)
    *G06F 12/0893* (2016.01)

(52) U.S. Cl.
    CPC ............ *G06F 3/0679* (2013.01); *G06F 11/34* (2013.01); *G06F 11/348* (2013.01); *G06F 12/0246* (2013.01); *G06F 12/0888* (2013.01); *G06F 12/0893* (2013.01); *G06F 2201/885* (2013.01); *G06F 2212/1016* (2013.01); *G06F 2212/1044* (2013.01); *G06F 2212/222* (2013.01); *G06F 2212/502* (2013.01); *G06F 2212/601* (2013.01); *G06F 2212/7205* (2013.01); *G06F 2212/7206* (2013.01)

(58) Field of Classification Search
    CPC ............ G06F 12/0246; G06F 12/0888; G06F 12/0893; G06G 12/00
    See application file for complete search history.

(56) References Cited

U.S. PATENT DOCUMENTS

| | | | |
|---|---|---|---|
| 9,092,340 | B2 | 7/2015 | Sprouse et al. |
| 9,128,845 | B2 | 9/2015 | Chang et al. |
| 9,176,862 | B2 | 11/2015 | Chen et al. |
| 9,195,604 | B2 | 11/2015 | Nemazie et al. |
| 9,268,701 | B1 | 2/2016 | Horn |
| 9,697,134 | B2 | 7/2017 | Hale et al. |
| 9,864,697 | B2 | 1/2018 | Hale et al. |
| 10,359,933 | B2 | 7/2019 | Muchherla et al. |
| 2005/0262306 | A1 | 11/2005 | Nenov et al. |
| 2007/0283081 | A1* | 12/2007 | Lasser ................ G06F 12/0246 711/E12.04 |
| 2008/0215800 | A1 | 9/2008 | Lee et al. |
| 2009/0100244 | A1 | 4/2009 | Chang et al. |
| 2009/0327590 | A1 | 12/2009 | Moshayedi |
| 2009/0327591 | A1 | 12/2009 | Moshayedi |
| 2010/0082884 | A1 | 4/2010 | Chen et al. |
| 2010/0115192 | A1 | 5/2010 | Lee |
| 2010/0122016 | A1 | 5/2010 | Marotta et al. |
| 2010/0174847 | A1 | 7/2010 | Paley et al. |
| 2010/0246257 | A1 | 9/2010 | Ito et al. |
| 2011/0271043 | A1 | 11/2011 | Segal et al. |
| 2012/0059992 | A1 | 3/2012 | Radke et al. |
| 2012/0124294 | A1 | 5/2012 | Atkisson et al. |
| 2012/0173807 | A1 | 7/2012 | Lasser |
| 2012/0185638 | A1 | 7/2012 | Schreiber et al. |
| 2012/0210041 | A1 | 8/2012 | Flynn et al. |
| 2013/0003457 | A1 | 1/2013 | Wood et al. |
| 2013/0024601 | A1 | 1/2013 | Floman et al. |
| 2013/0173844 | A1 | 7/2013 | Chen et al. |
| 2013/0191601 | A1 | 7/2013 | Peterson et al. |
| 2013/0227203 | A1 | 8/2013 | Marotta et al. |
| 2013/0254458 | A1 | 9/2013 | Pittelko |
| 2014/0181558 | A1* | 6/2014 | Taha ..................... G06F 1/3206 713/323 |
| 2014/0281126 | A1 | 9/2014 | Bleyer et al. |
| 2015/0092488 | A1 | 4/2015 | Wakchaure et al. |
| 2015/0149735 | A1 | 5/2015 | Nale et al. |
| 2015/0301763 | A1 | 10/2015 | Shaharabany et al. |
| 2015/0363105 | A1 | 12/2015 | Nakao et al. |
| 2016/0011984 | A1 | 1/2016 | Speer et al. |
| 2016/0077968 | A1 | 3/2016 | Sela et al. |
| 2016/0098350 | A1* | 4/2016 | Tang .................. G06F 12/0871 711/103 |
| 2016/0188424 | A1 | 6/2016 | Walls |
| 2016/0342344 | A1 | 11/2016 | Kankani et al. |
| 2017/0075812 | A1 | 3/2017 | Wu et al. |
| 2017/0177244 | A1* | 6/2017 | Khochare ............ G06F 3/0688 |
| 2017/0262376 | A1 | 9/2017 | Hale et al. |
| 2018/0107603 | A1 | 4/2018 | Hale et al. |
| 2018/0373639 | A1 | 12/2018 | Hale et al. |

FOREIGN PATENT DOCUMENTS

| | | |
|---|---|---|
| CN | 105487986 A | 5/2021 |
| TW | 201600964 A | 1/2016 |
| TW | 201621668 A | 6/2016 |
| WO | 2010/078222 A1 | 7/2010 |
| WO | 2012/166304 A2 | 12/2012 |

OTHER PUBLICATIONS

Korean Second Office Action for Application No. 10-2019-7010167, dispatched Nov. 30, 2021, 7 pages.
Chinese Notice of Allowance for Application No. 202110346710.X, issued Mar. 29, 2022, 9 pages.
European Communication pursuant to Article 94(3) EPC for European Application No. 17851296.8, dated Apr. 9, 2021, 5 pages.
International Search Report from International Application No. PCT/US2017/048671, mailed Dec. 13, 2017, 9 pages.
International Written Opinion from International Application No. PCT/US2017/048671, mailed Dec. 13, 2017, 13 pages.
Korean First Office Action for Application No. 10-2019-7010167, dispatched Apr. 30, 2021, 19 pages.
Micron Inc. Technical Marketing Brief, entitled "Optimized Client Computing With Dynamic Write Acceleration," by Dave Glen, copyright 2014, pp. 1-5.
Supplemental European Search Report and Opinion from European Application No. 17851296.8, dated Apr. 21, 2020, 11 pages.
Taiwanese Office Action and Search Report from Taiwanese Application No. 106131957, dated Jan. 28, 2019, 9 pages.
Taiwanese Office Action for Application No. 108120712, issued Aug. 25, 2020, 23 pages.
Tanguy et al., "M600 SSD's Dynamic Write Acceleration Boosts Performance and Value," Micron Technology, Inc., Storage Blog, Sep. 16, 2014, 4 pages.
Chinese Office Action for Chinese Application No. 201780057208.9 dated Sep. 24, 2019, 6 pages.

* cited by examiner

MEMORY DEVICES AND SYSTEMS INCLUDING STATIC AND DYNAMIC CACHES, AND RELATED METHODS

CROSS-REFERENCE TO RELATED APPLICATIONS

This application is a continuation of U.S. patent application Ser. No. 16/396,432, filed Apr. 26, 2019, now U.S. Pat. No. 11,204,696, issued Dec. 21, 2021, which is a continuation of U.S. patent application Ser. No. 15/269,518, filed Sep. 19, 2016, now U.S. Pat. No. 10,359,933, issued Jul. 23, 2019, the disclosure of each of which is hereby incorporated herein in its entirety by this reference.

TECHNICAL FIELD

The disclosure, in various embodiments, relates generally to the field of computer systems and mass storage devices. More specifically, the disclosure relates to mass storage devices including an adaptive hybrid cache including both a static cache and a dynamic cache during operation.

BACKGROUND

Non-volatile memory is commonly used for mass storage of data, such as within consumer electronic devices. Various types of mass storage devices are currently in use, such as solid state devices (SSDs), hard disk drives (HDDs), and hybrid drives. Flash memory devices (e.g., SSDs) have developed into a popular source of non-volatile memory for a wide range of electronic applications. Common uses for flash memory include personal computers, flash drives, digital cameras, and cellular telephones. Program code and system data such as a basic input/output system (BIOS) are also stored in flash memory devices for use in personal computer systems.

Conventional flash memory devices may include an array of memory cells organized into memory blocks that can be erased on a block-by-block basis (and reprogrammed on a page-by-page basis). Flash memory may achieve higher levels of storage capacity by including multi-level cells (MLC), triple-level cells (TLC), quad-level cells (QLC), etc., or combinations thereof in which the memory cell has multiple levels that enable more bits (i.e., data values) to be stored. For example, in a single-level cell (SLC), two states can exist such that only one bit per cell may be stored. MLC may be configured to store two bits per cell, TLC may be configured to store three bits per cell, QLC may be configured to store four bits per cell, and so on. Blocks may be written in different possible modes depending on the types of cells involved. For example, a QLC may be written to using QLC mode, TLC mode, MLC mode or even SLC mode. Thus, writing to a QLC in QLC mode may result in four bits being stored in the QLC, writing to a QLC in TLC mode may result in three bits being stored in the QLC, writing to a QLC in MLC mode may result in two bits being stored in the QLC, writing to a QLC in SLC mode may result in one bit being stored in the QLC. The other cell types can be programmed in different modes in a similar manner. Writing to a QLC/TLC/MLC in SLC mode may be faster than writing in the QLC/TLC/MLC modes; however, it may come at a cost by reducing the storage capacity of the memory device by writing to the QLC/TLC/MLC cells by not maximizing their capabilities.

During programming of a block of memory cells, a fixed cache of SLC memory cells is often used to temporarily store data that is to be programmed into a block of higher capacity memory cells of the memory device. For example, in an MLC-based memory device, a fixed size SLC cache can be used by the memory controller to store data in the SLC cache prior to subsequent programming into the MLC block of memory cells. This can improve memory speed as well as resulting in a higher total bytes written (TBW) due, in part, to a larger endurance capability. The performance improvement may be a function of the size of the SLC cache, but has the drawback of reducing the total storage capacity of the memory device because a fixed portion of the memory is used as a SLC cache and cannot be used to store user data with the same efficiency as MLC (or TLC, QLC, etc.).

Other conventional systems have used a dynamic SLC cache as an alternative to the fixed SLC cache. With a dynamic SLC cache, the entire memory array may include the higher level cells but the memory controller may allocate a portion of the memory array dynamically to write to in SLC mode when caching is desired. Overall storage capacity for the cache may be increased, but at the expense of reducing the capacity of the main memory array and the endurance capability of the cache.

DETAILED DESCRIPTION

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

The illustrations presented herein are not meant to be actual views of any particular apparatus (e.g., device, system, etc.) or method, but are merely idealized representations that are employed to describe various embodiments of the disclosure. Accordingly, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments include features that improve the functionality of such memory devices including enabling a larger SLC cache available to the memory device, splitting a Host TBW Spec between a static cache and a dynamic cache, offering a larger Host TBW Spec with fewer reserved blocks and smaller endurance requirements. Thus, a new device and method for operating the memory device are described. As a result, the cost of the memory devices may decrease and the ability to develop new products in the market may improve, such that embodiments of the disclosure provide improvements in the technical field of memory devices, particularly for SLC cache-based memory devices.

In addition, it is noted that the embodiments may be described in terms of a process that is depicted as a flow-chart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code, firmware, etc.) on a computer-readable medium. Computer-readable media includes both computer storage media and communication media including any medium that facilitates transfer of a computer program from one place to another.

Embodiments of the present disclosure include Flash-based memory devices (e.g., NAND Flash), which may include non-volatile memory blocks of single-level cells (SLC), multi-level cells (MLC), triple-level cells (TLC), quad-level cells (QLC), or combinations thereof. Thus, "SLC" refers to a single-level cell, "MLC" refers to a multi-level cell, "TLC" refers to a triple-level cell, and "QLC" refers to a quad-level cell. The term "XLC" may generically refer to cells that are not SLC, wherein "X" refers to an integer greater than 1. In other words, XLC may refer to MLC, TLC, QLC, etc.

As used herein, "SLC mode," "MLC mode," "TLC mode" "QLC mode," etc., refer to different operating modes of the memory device. As discussed above, SLC mode includes writing a single bit to a memory cell (even if the memory cell is an XLC). MLC mode includes writing two bits to a memory cell (even if the memory cell is a TLC, QLC, or above). TLC mode includes writing three bits to a memory cell (even if the memory cell is a QLC or above). QLC Mode includes writing four bits to a memory cell (even if the memory cell is above QLC).

As used herein, "write performance" refers to the speed at which user data is written to the memory device. Generally, the write performance is faster for writing data in SLC mode than in XLC mode.

As used herein, "static cache" refers to SLC cache that is obtained from a reserved SLC block within the memory array. The reserved SLC block may be configured to only be operable in SLC mode. Data in the static cache is typically emptied (e.g., during garbage collection discussed below) by being written to the XLC memory blocks of the memory array in XLC mode to free up the static cache for the next wave of host data.

As used herein, "dynamic cache" refers to storage in the memory array available to the SLC cache that is borrowed from the XLC memory blocks that form the bulk storage area within the memory array. The dynamic cache includes the borrowed XLC memory blocks being temporarily used to cache data using SLC mode. As a result, some of the XLC memory blocks are allocated to be used for both bulk storage as well as SLC cache. Writing the host data to the dynamic cache using the XLC memory blocks in SLC mode may result in a higher erase cycle requirement when compared to using XLC mode. Also, dynamic cache may require a larger XLC endurance requirement, which may be very expensive when compared to an implementation only using a static cache.

As used herein, NAND "endurance" refers to the number of program/erase cycles ("PE cycles") that a NAND block can tolerate before the memory device typically begins to fail due to normal wear of the memory device. The endurance of an XLC block is typically less than the endurance of an SLC block because the XLC cell may need to accommodate multiple threshold voltage (Vt) distributions and larger Vt movement between the erase state and the program state. An SLC stores 1 bit of information, and hence, there are only two Vt states (e.g., "0" and "1"). An MLC stores 2 bits of information, such that the number of Vt states are 4 (i.e., implying 4 Vt distributions). A TLC stores 3 bits of information that may include 8 Vt distributions. A QLC stores 4 bits of information that may include 16 Vt distributions. The fewer the Vt distributions, the less the overlap is between Vt distributions, and the less the fail bit count. Thus, a memory block with fewer Vt distributions can withstand more program/erase cycles. As a non-limiting example, an XLC block may have an endurance on the order of around 1,000 PE cycles, and an SLC block may have an endurance on the order of around 40,000 PE cycles.

As used herein, the term "TBW Spec" refers to the total bytes written (TBW) that can be reliably written to a particular region of the memory array over its durable lifetime. The "Host TBW Spec" refers to the TBW that the host can write to the entire XLC block memory device (e.g., drive) over its lifetime. The Host TBW Spec may be viewed as the reliable lifetime of the memory device specified by the manufacturer based on an amount of data that can be written before the memory device typically begins to fail due to normal wear of the memory device. The Host TBW Spec is dependent on the endurance in that the Host TBW Spec is generally set at the capacity of the memory device multiplied by the endurance. For example, a 200 gigabyte (GB) drive having XLC memory blocks having an endurance of 1000 PE cycles may have a Host TBW Spec of 200,000 GB (i.e., 200 terabyte (TB)) of data that may be written to the drive over the lifetime of the drive (although the most data stored on the drive at any given time is 200 GB). The static cache and the dynamic cache may also have their own TBW Specs associated with them, which may or may not be the same as the Host TBW Spec of the entire memory device as will be discussed further below.

As used herein, "write amplification" (WA) refers to the phenomenon that the actual amount of physical data written to the memory array is greater than the amount of logical data written by the host. This is because the memory device may move data after the data has been stored before the data can be erased. The Host TBW Spec value that is reported to the customer as the lifetime of the memory device may take into account the WA factor. For example, if the Host TBW Spec is reported as 200 TB and the WA factor is 1.2 (Host=1×and garbage collection=0.2×), the total bytes written to NAND is approximately 240 TB when considering the actual amount of data written by the memory device over its lifetime. In other words, the endurance of the XLC blocks needs to be 1200 P/E cycles over a 200 GB NAND size to support 200 TB TBW from the host. Alternatively, if the size of the NAND is 200 GB and endurance is 1000 P/E cycles, the TBW that can be written by the host is 166 TB. Similarly, if the static cache size is 6 GB and endurance is 40 K P/E cycles, the total amount of data that may be written to the NAND is 240 TB. If the static cache WA is 1.2, then the drive can support 200 TB TBW from the host.

Embodiments of the present disclosure include a memory device comprising x-level cell (XLC) blocks of non-volatile memory cells configured to be programmable with more than one bit, wherein x represents an integer greater than one, single-level cell (SLC) blocks of non-volatile memory cells, and a memory controller operably coupled with the XLC blocks and the SLC blocks. The memory controller is configured to operate a hybrid cache including a dynamic cache including the XLC blocks of non-volatile memory cells that are shared between the dynamic cache and main memory, and a static cache including the SLC blocks. The memory controller is further configured to disable at least one of the static cache or the dynamic cache responsive to monitoring a workload of the hybrid cache relative to the Total Bytes Written (TBW) Spec for the main memory over a durable lifetime for the memory device.

Embodiments of the present disclosure include a memory device comprising a memory array and a memory controller. The memory array includes single-level cell (SLC) blocks of non-volatile memory cells, and x-level cell (XLC) blocks of non-volatile memory cells, wherein x represents an integer greater than one. The memory controller is operably coupled with the XLC blocks and the SLC blocks, and configured to write host data to the SLC blocks as static cache in SLC mode, and write the host data to the XLC blocks as dynamic cache in SLC mode if the static cache is unavailable. The memory controller may also be configured to write host data to XLC blocks in XLC mode as the lowest priority option.

Figure 1:
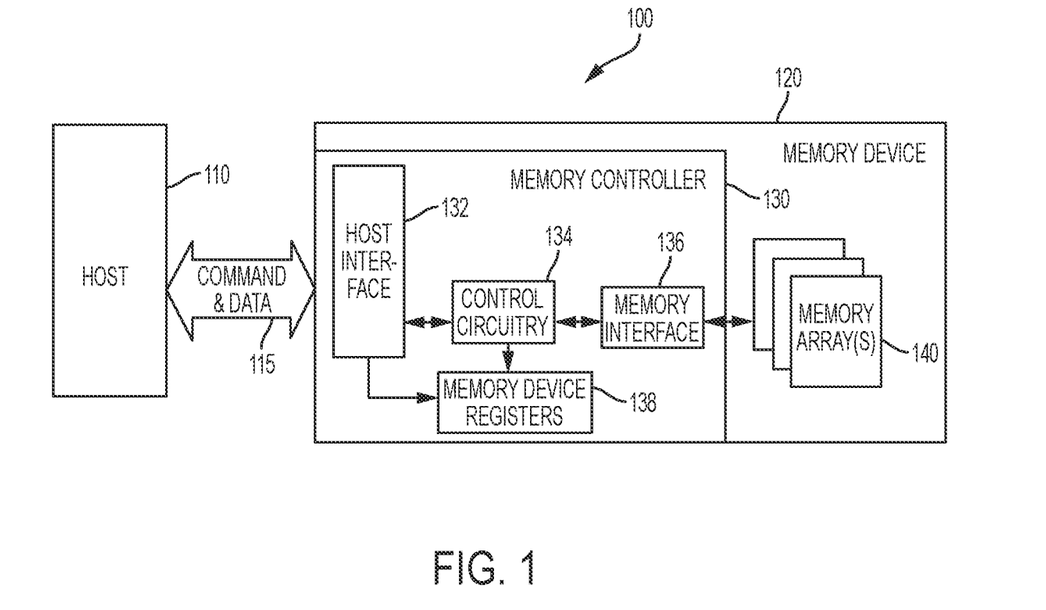
FIG. 1 is a schematic block diagram of an electronic system according to an embodiment of the present disclosure.

FIG. 1 is a schematic block diagram of an electronic system 100 including a host 110 operably coupled with a memory device 120 according to an embodiment of the present disclosure. The host 110 may be an external host (e.g., a microprocessor of a larger system) that also acts as a controller for the memory device 120. For example, the host 110 may include a host controller configured to communicate commands (e.g., write, read, erase, etc.) and data with the memory device 120 over a command and data bus 115. Although not shown, it is understood that the host 110 may include an operating system, file systems, user interfaces, and the like to be operably by a user.

The memory device 120 may include a memory controller 130 that is operably coupled with one or more memory arrays 140. The memory arrays 140 may include memory cells that may be arranged in banks of word line rows and bit line columns. In some embodiments, the columns of the memory array 140 comprise series strings of memory cells. As a non-limiting example, the memory arrays 140 may be configured as non-volatile memory, such as NAND Flash. The memory device 120 may be incorporated within an embedded multi-media controller (also referred to as "embedded MMC" or "eMMC"), Solid State Drives (SSDs), Universal Flash Storage (UFS) devices, memory cards (e.g., SD cards, CompactFlash cards, etc.), and/or other devices that utilize non-volatile memory as discussed herein.

The memory controller 130 may include host interface circuitry 132, control circuitry 134, memory interface circuitry 136, and memory device registers 138. These elements are examples of what may be present within a memory controller 130; however, it should be understood that some embodiments may include only a subset of these elements and/or additional memory device circuitry. In some embodiments, the memory controller 130 may be external to the memory device 120.

The host interface circuitry 132 may be configured to provide an interface between the memory device 120 and the host 110, such as through buffers, registers, etc. The control circuitry 134 may be configured to control the operations of the memory array(s) 140, sometimes in response to commands from the host 110 such as by performing data sense operations (e.g., read), data program operations (e.g., write), and data erase operations. The control circuitry 134 may include a state machine, a sequencer, and/or another type of control circuitry that is configured to generate control signals that control the memory arrays 140. The memory interface circuitry 136 may be configured to provide bidirectional data communication between the control circuitry 134 and the memory arrays 140. The memory interface circuitry 136 may include write circuitry, read circuitry, decoders, buffers, address circuitry, sense amplifiers, etc. Additional details regarding such elements are described in U.S. Pat. No. 9,195,604, issued Nov. 24, 2015, and entitled "Dynamic Memory Cache Size Adjustment in a Memory Device," the disclosure of which is hereby incorporated in its entirety herein by this reference. The memory device registers 138 may be configured to store control data for various operations performed by the memory controller 130. The memory device registers 138 may be incorporated within the control circuitry 134 or separate from the control circuitry 134 in some embodiments.

The memory arrays 140 may be SLC blocks of non-volatile memory cells and XLC blocks of non-volatile memory cells. The SLC blocks may be used as an SLC cache for the memory device 120. The XLC blocks may be used as main memory and/or a dynamic cache for the memory device 120 such that at least some (e.g., all) of the XLC blocks may be shared by the main memory and the dynamic cache. The SLC cache may, therefore, be configured as a hybrid cache having a reserved static portion of SLC blocks and a dynamic portion of XLC blocks. When used as main memory, the XLC blocks may be written to in XLC mode. When used as dynamic cache, the XLC blocks may be written to in SLC mode.

The control circuitry 134 may be configured to operate the memory array 140 by managing data writes, copies, erases, etc. The control circuitry 134 may operate the hybrid cache such as by disabling at least one of the static cache or the dynamic cache responsive to monitoring workload of the hybrid cache relative to the TBW Spec for the XLC blocks over a durable lifetime for the memory device 120 as will be discussed further below.

Figure 2:
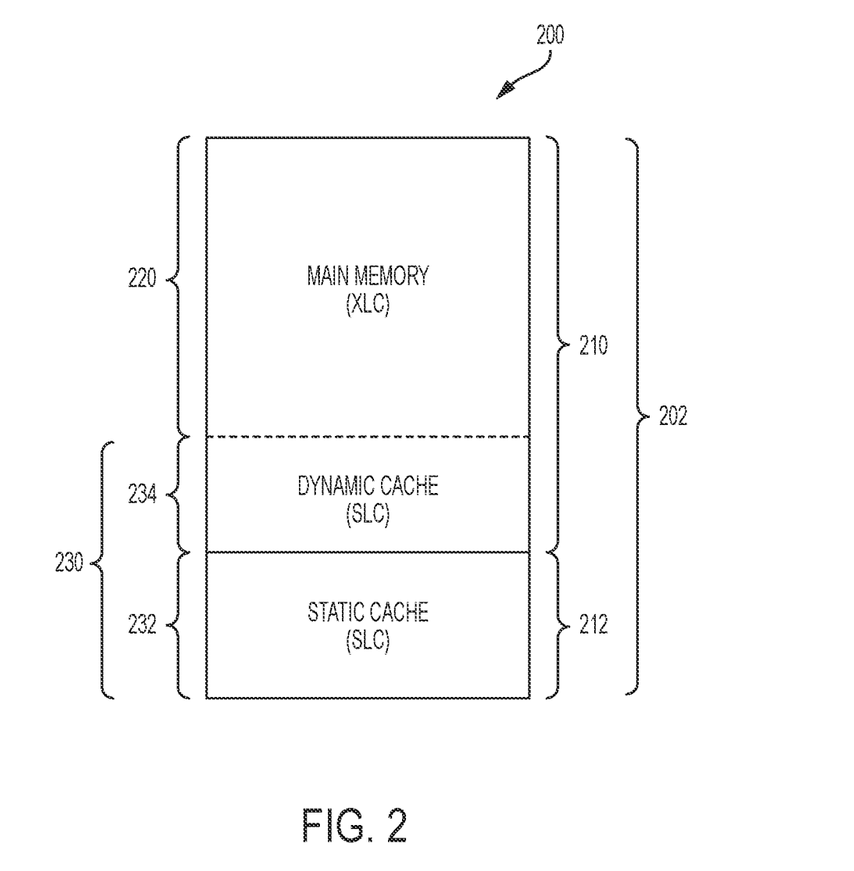
FIG. 2 illustrates a simplified block diagram of the memory device shown in FIG. 1.

FIG. 2 illustrates a simplified block diagram of a memory device 200. The memory device 200 may comprise the memory device 120 of FIG. 1 that has been further simplified for ease of discussion. Similarly, the memory array 202 may comprise one or more of the memory arrays 140 of FIG. 1.

The memory device 200 includes a memory array 202 that is configured with XLC memory blocks 210 (also referred to as "XLC blocks") and SLC memory blocks 212 (also referred to as "SLC blocks"). The XLC memory blocks 210 are configured with non-volatile memory cells that are programmable to contain multiple bits (e.g., MLC, TLC, QLC, etc.) at a time, whereas the SLC memory blocks 212 are configured with non-volatile memory cells that are programmable to contain a single bit at a time. The memory array 202 may also be divided into a main memory array 220 (also referred to as "main memory 220") and a hybrid SLC cache memory array 230 (also referred to as "hybrid SLC cache 230"). The hybrid SLC cache 230 may include a static cache 232 and a dynamic cache 234 according to an embodiment of the present disclosure.

The static cache 232 may include the SLC memory blocks 212 as a dedicated and defined portion of the memory array 202. Thus, the configuration of the static cache 232 may enable the SLC memory blocks 212 to only be operable by the memory controller 130 (FIG. 1) in SLC mode. As a result, the SLC memory blocks 212 of the static cache 232 may be reserved blocks in the memory array 202 having a fixed capacity (e.g., 6 GB). In other words, the static cache 232 is fixed in size and dedicated to be a temporary data cache for the memory array 202, and may not be available for long term storage of the host data.

The dynamic cache 234 may include at least some of the XLC memory blocks 210 of the memory array 202. As discussed above, the XLC memory blocks 210 may be operable (in whole or in part) by the memory controller 130 (FIG. 1) as part of the main memory 220 (in XLC mode) or the hybrid SLC cache 230 (in SLC mode) depending on the free space available in the memory device 200. In other words, the allocation of the XLC memory blocks 210 between the main memory 220 and the hybrid SLC cache 230 may change dynamically and the amount of the available XLC memory blocks 210 actually used for the dynamic cache 234 may not be fixed over all time. Of course, the maximum allocation of the dynamic cache 234 may be fixed. In some embodiments, the entirety of the XLC memory blocks 210 may be made available to be used as dynamic cache 234. As a result, any free space within the XLC memory blocks 210 may be available for the dynamic cache 234 if additional space is needed during a user burst of data in which host data is desired to be written into the hybrid SLC cache 230 in SLC mode, but in which the static cache 232 does not have enough available free space. Thus, the size of the actual dynamic cache 234 may vary at a given point in time depending on the number of XLC memory blocks 210 that are in use by the hybrid SLC cache 230.

In some embodiments, the XLC memory blocks 210 may be further partitioned into a first portion (not shown) dedicated to the main memory 220 and a second portion (not shown) that may be available to the hybrid SLC cache 230; however, doing so may limit the maximum size of the dynamic cache 234. In such an embodiment, the first portion may only be operable by the memory controller 130 (FIG. 1) in XLC mode, whereas the second portion may be operable by the memory controller 130 in either XLC mode or in SLC mode. In other words, the XLC memory blocks 210 of the first portion are permanently allocated to main memory such that they are operated in XLC mode, and the XLC memory blocks 210 of the second portion may be allocated to either the main memory 220 (in XLC mode) or the hybrid SLC cache 230 (in SLC mode).

In operation, data from the host may be written into the hybrid SLC cache 230 and/or the main memory 220. When operable with the main memory 220, the XLC memory blocks 210 may be operated in XLC mode. When operable with the hybrid SLC cache 230, the XLC memory blocks 210 may be operated in SLC mode.

In some embodiments, the host data may first be written into the hybrid SLC cache 230. In some embodiments, the host data may be written to the static cache 232 in SLC mode by default if sufficient free space is available in the static cache 232. If free space within the static cache 232 is not available, the host data may be written to the dynamic cache 234 in SLC mode if sufficient free space is available in the dynamic cache 234. If free space within the dynamic cache 234 is not available, the host data may be written to the main memory 220 in XLC mode if sufficient free space is available in the main memory 220. In some embodiments, the first attempt at writing host data to the hybrid SLC cache 230 may be to the dynamic cache 234, such as, for example, if the static cache 232 has been disabled and/or if usage of the static cache 232 and the dynamic cache 234 are desired to be balanced. In some embodiments, host data (or certain types of host data) may be written directly to the main memory 220 bypassing the hybrid SLC cache 230.

As the hybrid SLC cache 230 is filled during operation of the memory device 200, the host data may be moved from the hybrid SLC cache 230 to the main memory 220 to free up space for the hybrid SLC cache 230 during a process often referred to as "garbage collection." In some situations, both valid and invalid data may be moved from the hybrid SLC cache 230 to the main memory 220; however, often only valid data is moved from the block and then the entire block in the hybrid SLC cache 230 is erased and reclaimed. Similarly, blocks in main memory 220 containing old and new data can be reclaimed by moving the new data to another block in main memory 220 and then erasing the old block. Garbage collection may be initiated responsive to a period of inactivity (e.g., idle time) of writing to the memory device 200 or some other triggering event. The XLC endurance requirement of the memory device 200 may be dependent on the garbage collection efficiency of the firmware design.

At any point in the memory device's lifetime, there may be some form of the hybrid SLC cache 230—it might be one of the static cache 232 or the dynamic cache 234, or both in some cases. In some embodiments, each of the static cache 232 and the dynamic cache 234 may support the full Host TBW Spec such that both are available during the lifetime of the memory device 200. In some embodiments, however, either the static cache 232 or the dynamic cache 234 may not support the full TBW Spec. For example, the static cache 232 may not support the full TBW Spec because of insufficient SLC capacity to meet the endurance requirement over its entire lifetime. To increase the size of the static cache 232 a sufficient amount to support the full TBW Spec may be undesirable from a cost/size perspective. In another example, the dynamic cache 234 may not support the full TBW Spec because of the higher endurance required of the XLC memory blocks being operated in SLC mode.

It should be noted that although each of the main memory 220, the dynamic cache 234, and the static cache 232 are shown in FIG. 2 as being continuous, embodiments of the disclosure also include partitioning of the memory array 202 such that each group of blocks is not continuous. In addition, it is recognized that multiple memory arrays may be present within the memory device 200 and that partitioning of the main memory 220, the dynamic cache 234, and the static cache 232 may be at the array level and/or the block level.

Figure 3:
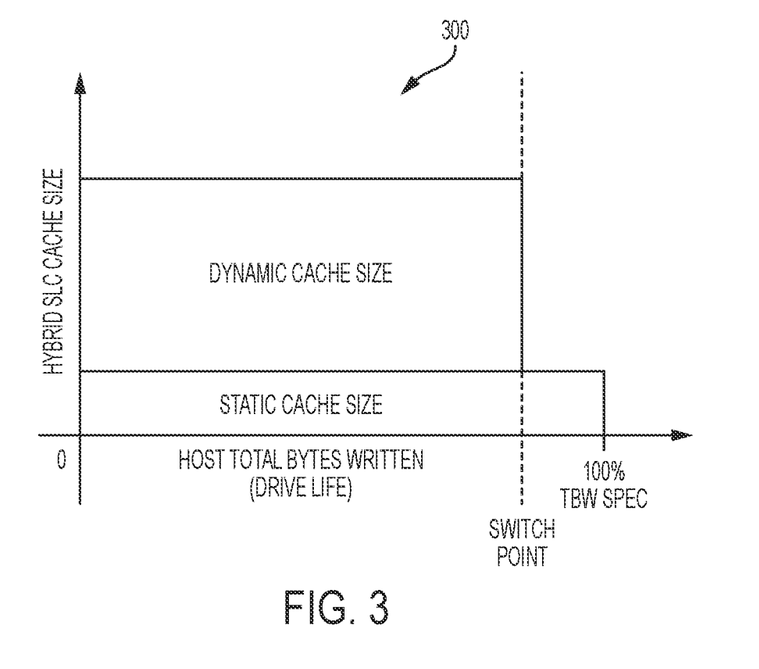
FIGS. 3 and 4 are graphs showing the size and availability of each of the static cache and the dynamic cache according to different embodiments of the disclosure.
Figure 4:
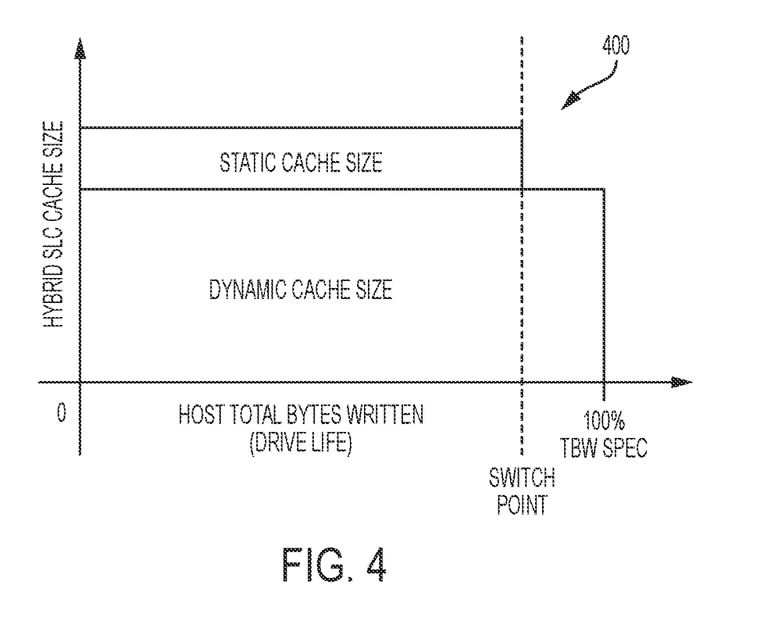

FIGS. 3 and 4 are graphs 300, 400 showing the size and availability of each of the static cache and the dynamic cache according to different embodiments of the disclosure. In the graphs 300, 400, the x-axis represents the host's total bytes written (i.e., as a percentage of the drive's life), and the y-axis represents the size of the hybrid SLC cache. As a result, the end design will support a larger SLC cache as well as larger Host TBW Spec with fewer reserved blocks and a reduced NAND endurance requirement. A larger SLC cache and larger Host TBW Spec may improve the user experience. A smaller SLC cache may provide cost savings to the memory device. A reduced NAND endurance requirement not only improves the time to market, but can also be traded off with faster XLC write speeds.

Referring specifically to FIG. 3, the graph 300 illustrates the situation in which the static cache is capable of supporting the full TBW Spec, but the dynamic cache size is not capable of supporting the full TBW Spec. The overall SLC cache size may be increased in the form of dynamic cache, but the dynamic cache may be designed to support only a percentage (X %) of Host TBW Spec.

At regular intervals, the memory device may monitor the workload of its hybrid cache. For example, the memory controller may monitor the workload by counting the PE cycles consumed by the XLC blocks to determine the usage of the XLC blocks relative to the Host TBW Spec. Counting the XLC blocks may include counting the PE cycles of the XLC blocks when being operated as dynamic cache, as main memory, or a total amount for the combination of dynamic cache and main memory PE cycles. If the PE cycles for the XLC blocks triggers a switch point, the dynamic cache may be disabled. Thus, disabling the dynamic cache may be based, at least in part, on the user workload pattern of the memory device. In some embodiments, the switch point may be based on by tracking the amount of host data written to the dynamic cache and static cache. The firmware will maintain a separate host TBW counter for static cache and dynamic cache in this case.

In some embodiments, the switch point(s) may be set at a different level relative to the number of PE cycles remaining in the lifetime of the memory device. The switch point may be triggered if the PE cycles consumed by the XLC blocks being written to the dynamic cache in SLC mode is greater than the budget allotted for the dynamic cache, such that the remaining PE cycles for the main memory is not enough to support the remaining TBW Spec (including the WA factor). The switch point may not be triggered if the PE cycles consumed by the XLC blocks being written to the dynamic cache in SLC mode is less than the budget allotted for the dynamic cache, such that the remaining PE cycles for the main memory are enough to support the remaining TBW Spec (including the garbage collection WA for the static cache). This will be described further with respect to FIGS. 5A and 5B.

While the dynamic cache is disabled, the hybrid cache may only write host data to the static cache. If user bursts occur that are larger than the static cache is able to handle, the memory controller may write the host data to the main memory using XLC mode.

In some embodiments, disabling the dynamic cache may be effective through the end of a Host TBW Spec for the memory device. Thus, once the dynamic cache is disabled, the dynamic cache may remain disabled. In some embodiments, the disabled dynamic cache may be re-enabled. For example, the switch point may be set at a point lower than that latest point for the remaining PE cycles for the main memory to support the remaining TBW Spec. In such an embodiment, the memory controller may detect a trend that the usage of the dynamic cache is rapidly increasing in workload such that it is likely that the PE cycles of the main memory may be exceeded. The memory controller may temporarily disable the dynamic memory until the trend is reduced to an acceptable level.

Referring specifically to FIG. 4, the graph 400 shows the situation in which the dynamic cache is capable of supporting the full TBW Spec but the static cache size is not capable of supporting the full TBW Spec. The overall amount of SLC cache available may be increased in the form of dynamic cache to form the hybrid SLC cache, but the static cache portion may be designed to support only a percentage (X %) of Host TBW Spec.

At regular intervals, the memory device may monitor the PE cycles consumed for the SLC blocks to determine the usage of the SLC blocks relative to the SLC TBW Spec specifically allotted to the SLC reserved blocks. For example, the memory controller may be configured to monitor the workload of the hybrid cache by counting PE cycles of the static cache. If the PE cycles for the SLC blocks trigger a switch point, the static cache may be disabled. Thus, disabling the static cache may be based, at least in part, on the user workload pattern.

In some embodiments, the switch point may be triggered if the PE cycles consumed by the SLC blocks being written to the static cache is greater than amount allotted (e.g., 40,000). The switch point may not be triggered if the PE cycles consumed by the SLC blocks are less than the endurance of the SLC blocks. This will be described further with respect to FIGS. 5A and 5B. While the static cache is disabled, the hybrid cache may only write host data to the dynamic cache by writing to the dynamic cache first in SLC mode when new data is received. If user bursts occur that are larger than the dynamic cache is able to handle, the memory controller may write the host data to the main memory using XLC mode.

Figure 5A:
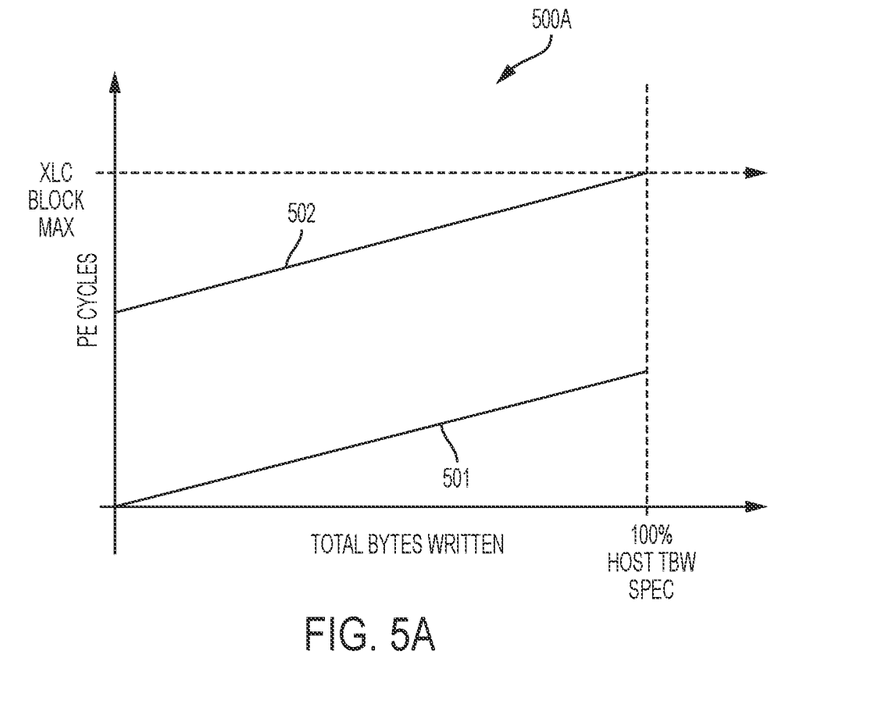
FIG. 5A is a graph used to graphically demonstrate a method for determining a switch point for disabling the dynamic cache according to an embodiment of the disclosure.
Figure 5B:
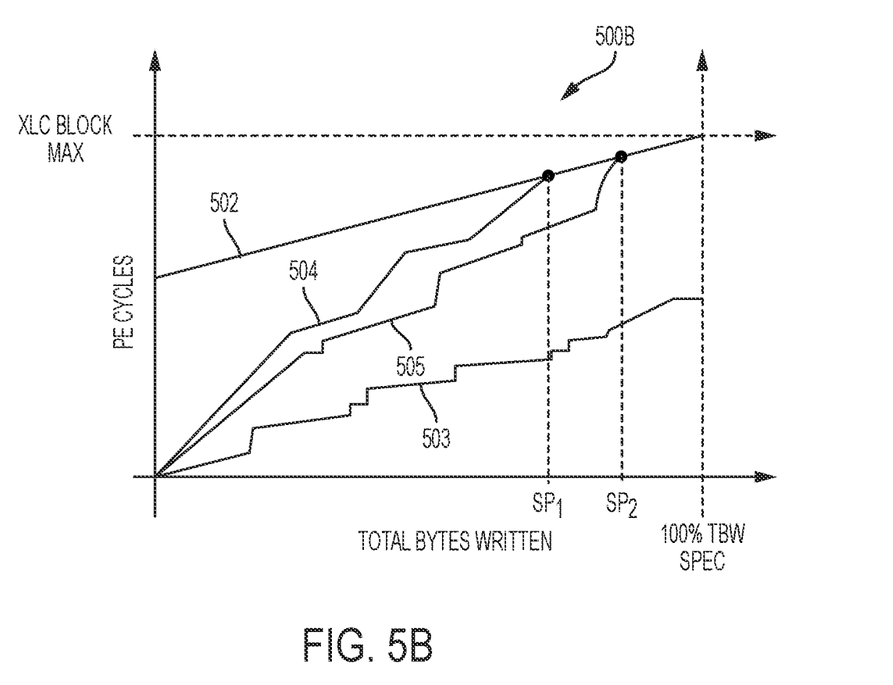
FIG. 5B is a graph used to graphically demonstrate a method for disabling the dynamic cache according to the switch point determined by the method of FIG. 5A.

FIG. 5A is a graph 500A used to graphically demonstrate a method for determining a switch point for disabling the dynamic cache according to an embodiment of the disclosure. FIG. 5B is a graph 500B used to graphically demonstrate a method for disabling the dynamic cache according to the switch point determined by the method graphically demonstrated by FIG. 5A. FIGS. 5A and 5B are applicable to the situation of FIG. 3 in which the dynamic cache size is less than the full Host TBW Spec, but the static cache size does support the full Host TBW Spec, if necessary.

Referring specifically to FIG. 5A, line 501 represents the PE cycles consumed by the XLC blocks over the lifetime of the memory device (i.e., Host TBW to the memory device) if no dynamic cache is used. The maximum number of PE cycles for the XLC blocks (e.g., both as main memory and dynamic cache) is also defined, which may be used to determine the switch points that may be used to determine when to disable the dynamic cache.

Line 502 is a line having the same slope as line 501, but adjusted upward so that the end of line 502 intersects with the maximum number of PE cycles for the XLC blocks and the end of the lifetime of the memory device. Line 502 represents the PE cycles that the XLC blocks may reach at which point the hybrid SLC cache can rely solely on the static cache without exceeding the maximum PE cycles for the XLC blocks. Line 502 may be used to determine the switch point for disabling the dynamic cache as will be further illustrated and discussed with reference to FIG. 5B. Therefore, line 502 may also be referred to as the "switch point threshold line."

Referring specifically to FIG. 5B, graph 500B shows the PE cycles of the memory device in operation. As discussed above, line 502 represents the switch point threshold line that is used to determine if a switch point has been crossed for disabling the dynamic cache. Lines 503, 504, 505 represent different usage cases for the total number of PE cycles that the XLC blocks have consumed over the lifetime of the memory device.

For example, line 503 is a first usage case in which the dynamic cache did not consume enough PE cycles for the workload of the XLC blocks to trigger a switch point. In this example, the host data may have been primarily written to the static cache, which means that host data was written under light loads over a long enough period of time to not require the dynamic cache using the XLC blocks too often in SLC mode without putting the XLC blocks at risk of exceeding its allotted PE cycles prior to the full Host TBW Spec for the memory device. Thus, the static cache was able to handle most writes from the host on its own.

Line 504 is a second usage case in which the XLC blocks consumed enough PE cycles to trigger a switch point (e.g., $SP_1$). In this example, the host data may have been written under heavier loads earlier in the lifetime of the memory device. Such workload bursts more often exceeded the capacity of the static cache and required using the XLC blocks often as part of the dynamic cache in SLC mode. Once the PE cycles of the dynamic cache reached the threshold line, switch point $SP_1$ was triggered causing the dynamic cache to be disabled. Otherwise, the hybrid SLC cache may have run the risk of exceeding the maximum PE cycles that may be consumed with the dynamic cache, which may also affect the reliability of the data stored in the XLC blocks as main memory prior to the end of the Host TBW Spec.

Line 505 is a third usage case in which the XLC blocks consumed enough PE cycles to trigger a switch point (e.g., $SP_2$). In this example, the host data may have been written under a heavier load, but not as heavy as with the second usage case. As a result, the PE cycles of the XLC blocks reached the threshold line later during the lifetime of the memory device. As a result, switch point $SP_2$ was triggered causing the dynamic cache to be disabled. Because the switch point $SP_2$ was triggered later in the lifetime of the memory device, the hybrid SLC cache may have to rely solely on the static cache for a smaller portion of host TBW spec than in the second usage case represented by line 504.

Figure 6A:
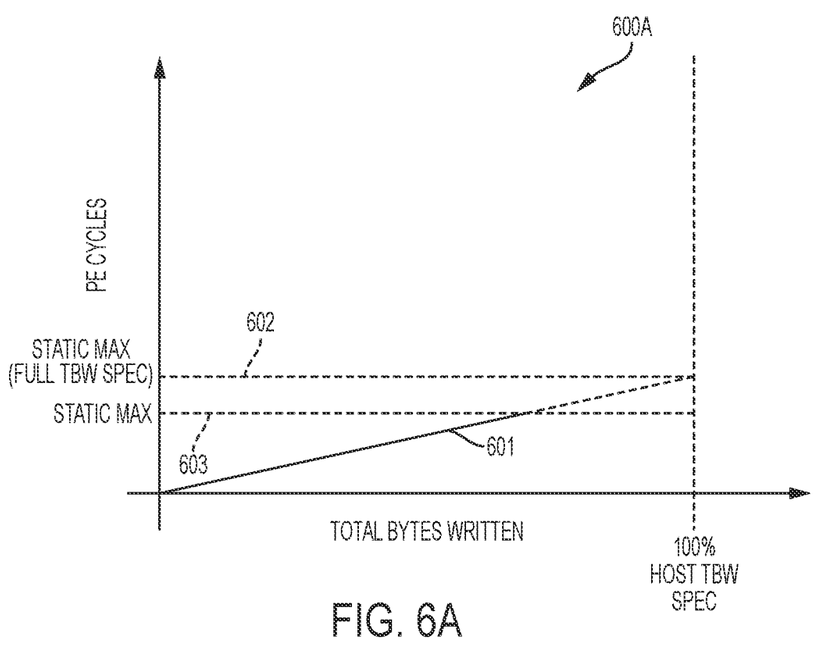
FIG. 6A is a graph used to graphically demonstrate a method for determining a switch point for disabling the static cache according to an embodiment of the disclosure.
Figure 6B:
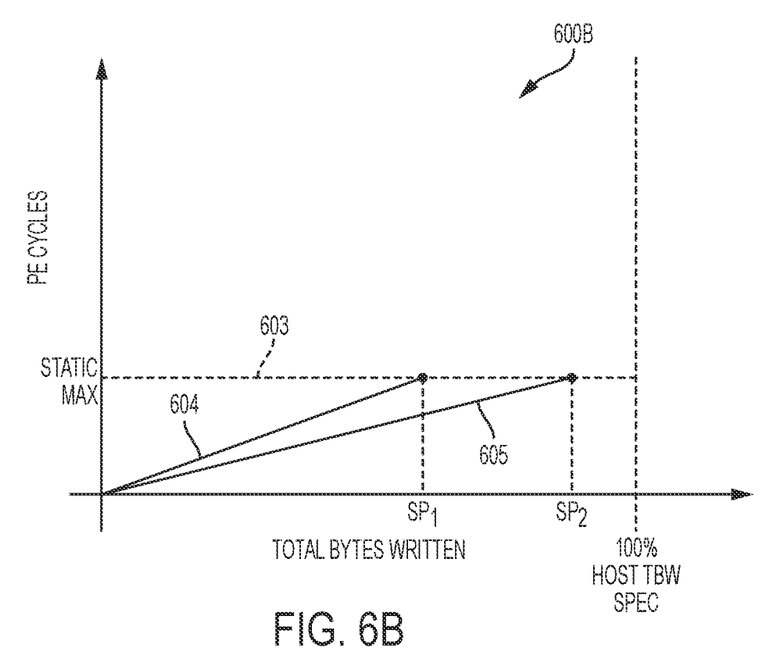
FIG. 6B is a graph used to graphically demonstrate a method for disabling the static cache according to the switch point determined by the method of FIG. 6A.

FIG. 6A is a graph 600A used to graphically demonstrate a method for determining a switch point for disabling the static cache according to an embodiment of the disclosure. FIG. 6B is a graph 600B used to graphically demonstrate a method for disabling the static cache according to the switch point determined by the method graphically demonstrated in FIG. 6A. FIGS. 6A and 6B are applicable to the situation of FIG. 4 in which the static cache size is less than the full Host TBW Spec, but the dynamic cache may support the full Host TBW Spec, if necessary.

Referring specifically to FIG. 6A, line 601 represents the PE cycles consumed by the static cache over the lifetime of the memory device (i.e., Host TBW to the memory device) if no dynamic cache is used. The maximum number of PE cycles to the static cache and the XLC blocks are defined, but it should not be understood that the distance between the two are to scale. In this example, line 602 represents the maximum PE cycles consumed by the static cache if the static cache were to support the full Host TBW Spec. As shown, however, line 601 falls short of line 602 such that the useful life of the static cache may expire prior to the end of the lifetime of the memory device. Line 603 represents the maximum PE cycles for the static cache and may serve as the switch point threshold line for determining when to disable the static cache from being written to.

Referring specifically to FIG. 6B, line 604 is a first usage case in which the static cache consumed enough PE cycles to trigger a switch point (e.g., $SP_1$). In this example, the host data may have been written under lighter loads earlier in the lifetime of the memory device. As a result, the host data was written to the static cache more often as there were not as many workload bursts to require the dynamic cache. Once the PE cycles of the static cache reached the threshold line, switch point $SP_1$ was triggered causing the static cache to be disabled. Otherwise, the hybrid SLC cache may run the risk of exceeding the maximum PE cycles that may be consumed with the static cache, which may also affect the reliability of the host data stored in the memory device prior to the end of the Host TBW Spec.

Line 605 is a second usage case in which the static cache consumed enough PE cycles to trigger a switch point (e.g., $SP_2$) later than the first usage case. In this example, the host data may have been written under a heavier load, which caused more of the PE cycles to be consumed by the dynamic cache. In addition, the static cache may also have consumed fewer PE cycles (e.g., due to a smaller WA operating on the static cache). As a result, the PE cycles of the static cache reached the threshold line later during the lifetime of the memory device. As a result, switch point $SP_2$ was triggered causing the static cache to be disabled. Because the switch point $SP_2$ was triggered later in the lifetime of the memory device, the hybrid SLC cache may have to rely solely on the dynamic cache in SLC mode for a smaller number of PE cycles.

In both cases of FIGS. 5A, 5B and 6A, 6B, splitting the total host TBW Spec burden between the static cache and the dynamic cache may result in a higher TBW Spec with a smaller static cache size, reduced endurance requirements of static cache and dynamic cache, as well as improvements in write performance to the memory device as a larger SLC cache is available during operation.

Embodiments of the present disclosure also include a method of operating a memory device having a hybrid single-level cell (SLC) cache. The method comprises receiving host data from a host, storing the host data in a hybrid SLC cache by writing the host data in SLC blocks of a static cache if the static cache is available, writing the host data in x-level cell (XLC) blocks in an SLC mode if the static cache is unavailable, and disabling at least one of the static cache or the dynamic cache responsive to the workload of the hybrid SLC cache reaching a predetermined threshold.

Embodiments of the present disclosure also include a method of operating a memory device having a hybrid single-level cell (SLC) cache. The method comprises partitioning a memory array into a first portion of SLC blocks and a second portion of x-level cell (XLC) blocks, storing at least a portion of a burst of host data into the first portion of SLC blocks as a static cache for the memory array, and storing at least another portion of the burst of host data into the second portion of XLC blocks in an SLC mode as a dynamic cache for the memory array responsive to the burst being determined to be greater than the static cache can handle.

Figure 7A:
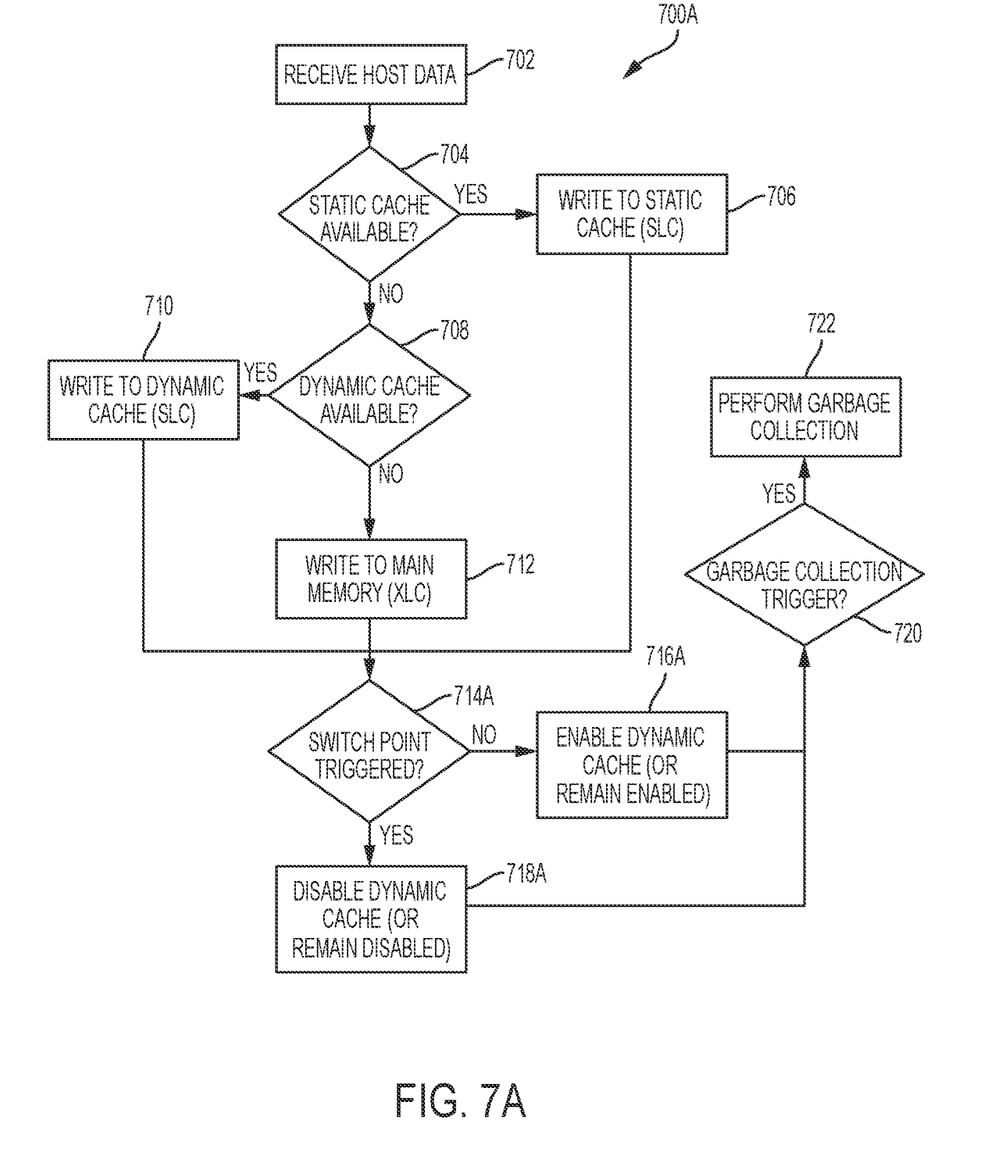
FIG. 7A is a flowchart illustrating a method for operating a memory device having a hybrid SLC cache according to an embodiment of the disclosure.
Figure 7B:
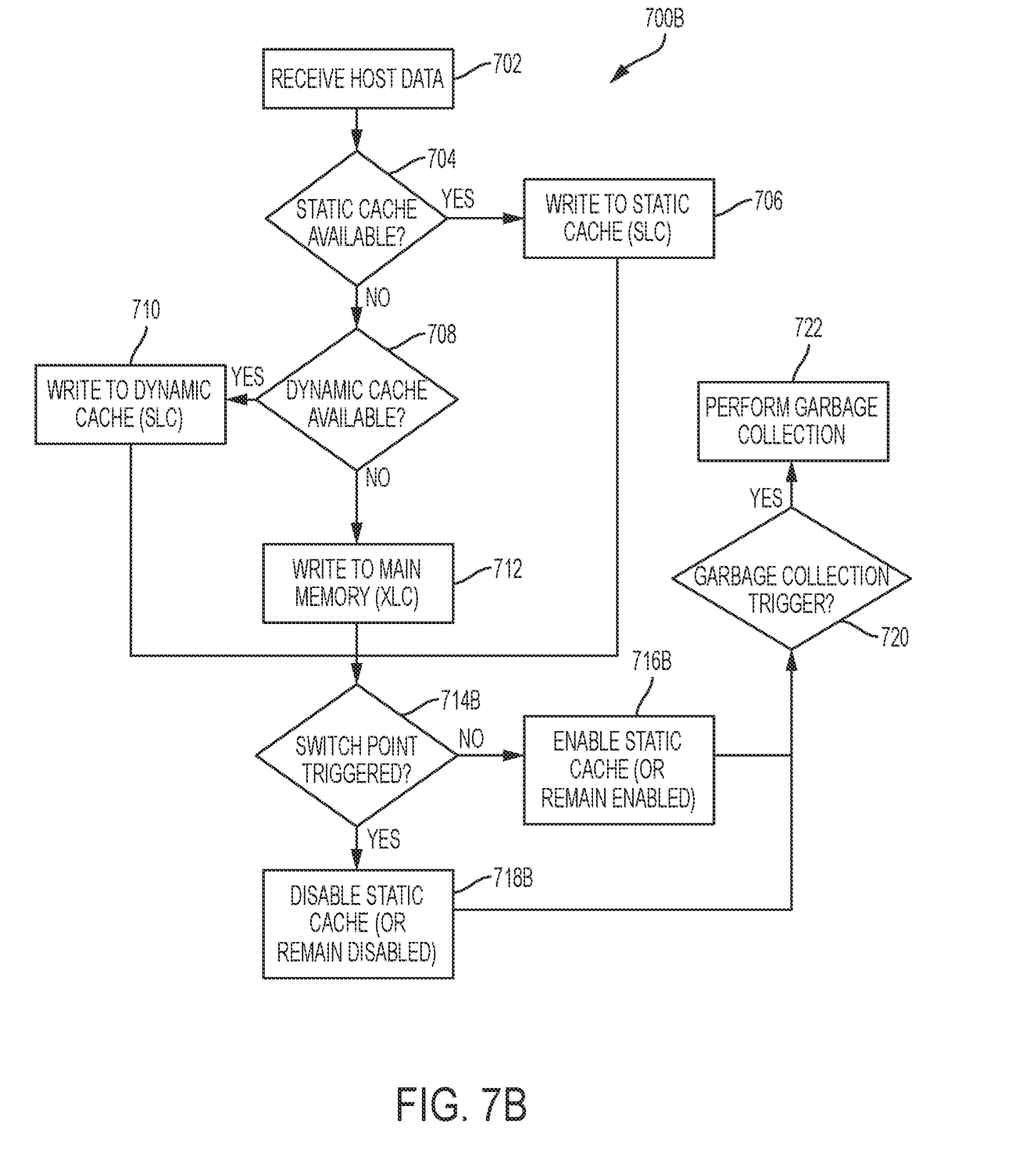
FIG. 7B is a flowchart illustrating a method for operating a memory device having a hybrid SLC cache according to another embodiment of the disclosure.

FIG. 7A is a flowchart 700A illustrating a method for operating a memory device having a hybrid SLC cache according to an embodiment of the disclosure. FIG. 7B is a flowchart 700B illustrating a method for operating a memory device according to another embodiment of the disclosure. In particular, FIG. 7A is applicable to the situation of FIG. 3 (and FIGS. 5A, 5B) in which the dynamic cache size is less than the full Host TBW Spec, but the static cache size does support the full Host TBW Spec if necessary. FIG. 7B is applicable to the situation of FIG. 4 (and FIGS. 6A, 6B) in which the static cache size is less than the full Host TBW Spec, but the dynamic cache size does support the full Host TBW Spec if necessary.

Referring specifically to FIG. 7A, at operation 702 the memory device may receive host data to be stored by the memory device. At operation 704, the memory controller of the memory device may verify if enough free space within the static cache is available. In some situations, the static cache may not have been emptied recently with a garbage collection process during the idle time such that there is not sufficient space to handle the current batch of host data. In other situations, the host data may simply be a larger batch than the capacity of the static cache allows. If there is sufficient free space within the static cache, the host data may be written to the static cache at operation 706.

If the host data is not able to be written to the static cache, the memory controller of the memory device may verify if enough free space within the dynamic cache is available at operation 708. In some situations, the dynamic cache may not have been emptied recently with a garbage collection process such that there is not sufficient space to handle the current batch of host data if the host data were to be written in SLC mode to the dynamic cache. In other situations, the host data may simply be a larger batch than the capacity of both the static cache and the dynamic cache allows. If there is sufficient free space within the dynamic cache, the host data may be written to the dynamic cache at operation 710. In other words, the host data may be written to the XLC memory blocks of the memory array in SLC mode.

If the host data is not able to be written to the dynamic cache, the host data may be written to the main memory at operation 712. In other words, the host data may be written to the XLC memory blocks of the memory array in XLC mode. This is, of course, assuming that there is enough free space within the memory array for the host data to be written in XLC mode. If there is not enough free space within the memory array for the host data to be written in XLC mode, garbage collection may be initiated as the host data is written. In addition, the firmware may maintain a certain number of swap blocks to use.

At operation 714A, the memory controller may determine if a switch point has been triggered for disabling the dynamic cache. As discussed above, the switch point may be determined according to a threshold line defined by the points at which the hybrid SLC may continue using solely the static cache while ensuring the PE cycles consumed by the XLC blocks do not exceed the maximum allowed PE cycles prior to the end of the Host TBW Spec. This threshold line may increase as the memory device gets closer to the end of its Host TBW Spec as fewer PE cycles will be needed for main memory storage in the XLC blocks prior to the end of the Host TBW Spec.

If the switch point has not been triggered, the dynamic cache may be enabled (e.g., remain enabled if already enabled) at operation 716A. If the switch point has been triggered, the dynamic cache may be disabled (e.g., remain disabled if already disabled) at operation 718A.

In some embodiments, the switch point may not be evaluated for every host operation as depicted in FIG. 7A. In some embodiments, the switch point may be checked every time a new block is opened or every certain interval of the Host TBW (e.g., the firmware tracks the total bytes written by the host). In such an embodiment, operations 714A, 716A, and 718A may not be performed for each host operation.

Referring specifically to FIG. 7B, operations 702 through 712 may be substantially the same as described with reference to FIG. 7A in terms of determining where to write the host data. Similarly, operations 720 and 722 may also be substantially the same as described with reference to FIG. 7A in terms of performing garbage collection. In some embodiments, a garbage collection trigger may not occur at the specific instance shown in FIG. 7B. For example, the firmware may trigger garbage collection during an idle time so that garbage collection is avoided while the host is writing data. In some embodiments, the order of garbage collection may be to release the static cache first and then release the dynamic cache.

Operations 714B, 716B, 718B may determine enabling/disabling the static cache instead of the dynamic cache. In particular, at operation 714B the memory controller may determine if a switch point has been triggered for disabling the static cache. As discussed above, the switch point may be determined according to a threshold line defined by the points at which the static cache has met its maximum allowable number of PE cycles.

If the switch point has not been triggered, the static cache may be enabled (e.g., remain enabled if already enabled) at operation 716B. If the switch point has been triggered, the static cache may be disabled (e.g., remain disabled if already disabled) at operation 718B.

Embodiments of the present disclosure also include an electronic system. The electronic system comprises a host device and a memory device operably coupled with the host device. The memory device is configured to control writing of host data into one of a static cache, a dynamic cache, and main memory, the static cache including single-level cell (SLC) blocks of a memory array, the dynamic cache and the main memory sharing at least a portion of x-level cell (XLC) blocks of the memory array. The XLC blocks include multiple bits per cell when programmed as main memory, and the XLC blocks include a single bit per cell when programmed as dynamic cache.

Figure 8:
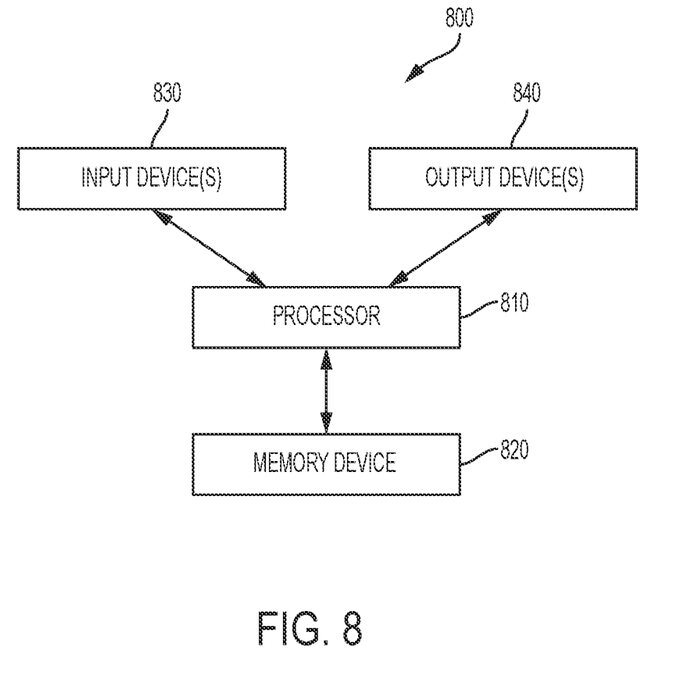
FIG. 8 is a schematic block diagram of an electronic system according to an embodiment of the present disclosure.

FIG. 8 is a schematic block diagram of an electronic system 800 according to an embodiment of the present disclosure. The electronic system 800 includes a processor 810 operably coupled with a memory device 820, one or more input devices 830 and one or more output devices 840. The electronic system 800 may be a consumer electronic device, such as a desktop computer, a laptop computer, a tablet computer, an electronic reader, a smart phone or other type of communication device, as well as any type of computing system incorporating non-volatile storage. As discussed above, the memory device 820 may include the main memory and the hybrid cache as discussed above. The processor 810 may be the host that is configured according to the description above.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

What is claimed is:

1. A memory device, comprising:
a memory array including dynamic cache and static cache; and a memory controller configured to:
completely disable the static cache of the memory array responsive to a number of program/erase (PE) cycles consumed by the static cache being greater than an endurance of the static cache such that writes are only directed to the dynamic cache; and
completely disable the dynamic cache of the memory array responsive to a number of PE cycles consumed by the dynamic cache being greater than an endurance of the dynamic cache such that writes are only directed to the static cache;
wherein the static cache includes single-level cell (SLC) blocks of the memory array of the memory device, and the dynamic cache and a main memory of the memory device share at least a portion of x-level cell (XLC) blocks of the memory array, wherein x represents an integer greater than one.

2. The memory device of claim 1, wherein the memory controller is configured to monitor a workload of hybrid cache including the static cache and the dynamic cache by counting PE cycles of at least one of the static cache and the dynamic cache.

3. The memory device of claim 1, wherein the memory controller is configured to:
disable the dynamic cache responsive to comparing PE cycles of the dynamic cache against a threshold triggering a switch point defined as a point at which operating cache of the memory array solely with the static cache ensures PE cycles of the dynamic cache remain below their maximum within a Total Bytes Written (TBW) Spec for the memory device, wherein the threshold increases as usage of the memory device approaches the TBW Spec; and
disable the static cache responsive to comparing PE cycles of the static cache against a threshold triggering a switch point defined as a point at which operating the cache solely with the dynamic cache ensures PE cycles of the static cache remain below their maximum within the TBW Spec.

4. The memory device of claim 1, wherein the memory controller is configured to monitor a workload of hybrid cache, including the static cache and the dynamic cache, relative to a Total Bytes Written (TBW) Spec for the memory device.

5. The memory device of claim 1, wherein at least one of the static cache and the dynamic cache is configured to have a Total Bytes Written (TBW) Spec that, by itself, does not support the TBW Spec as a cache over a durable lifetime for the memory device.

6. A memory device, comprising:
a memory array including:
a first set of memory blocks of non-volatile memory cells; and a second set of memory blocks of non-volatile memory cells; and a memory controller configured to:
write host data to the first set of memory blocks including static cache of a hybrid cache of the memory array;
write the host data to the second set of memory blocks including dynamic cache of the hybrid cache if the static cache is unavailable; and
disable the static cache of the memory array entirely responsive to comparing program/erase (PE) cycles consumed by the static cache against a maximum threshold for the static cache such that writes are only directed to the dynamic cache; and
disable the dynamic cache of the memory array entirely responsive to comparing PE cycles consumed by the dynamic cache against a maximum threshold for the dynamic cache such that writes are only directed to the static cache;
wherein the static cache includes single-level cell (SLC) blocks of the memory array of the memory device, and the dynamic cache and a main memory of the memory device share at least a portion of x-level cell (XLC) blocks of the memory array, wherein x represents an integer greater than one.

7. The memory device of claim 6, wherein the static cache is unavailable responsive to at least one of:
a workload burst of host data exceeding free space in the static cache; and
the memory controller disabling the static cache from being written to.

8. The memory device of claim 6, wherein the first set of memory blocks comprises single-level cell (SLC) memory blocks and the second set of memory blocks comprises x-level cell (XLC) memory blocks, x representing an integer greater than one.

9. The memory device of claim 8, wherein the memory controller is configured to write the host data to the SLC memory blocks and the XLC memory blocks in a SLC mode.

10. The memory device of claim 8, wherein the memory controller is configured to write the host data to main memory of the memory array if the static cache and the dynamic cache are unavailable.

11. The memory device of claim 10, wherein the memory controller is configured to write the host data to the main memory in an XLC mode.

12. The memory device of claim 6, wherein the memory controller is configured to disable at least one of the static cache or the dynamic cache based on a user workload pattern of the memory device relative to a Total Bytes Written (TBW) Spec for a main memory of the memory array.

13. A method, comprising:
    writing data in one of static cache or dynamic cache of hybrid cache of a memory array of a memory device; and
    completely disabling the static cache of the memory array or the dynamic cache of the memory array responsive to a number of program/erase (PE) cycles consumed by the one of the static cache or the dynamic cache being greater than an endurance of the one of the static cache or the dynamic cache such that data is only written to the other of the static cache or the dynamic cache;
    wherein the static cache includes single-level cell (SLC) blocks of the memory array of the memory device, and the dynamic cache and a main memory of the memory device share at least a portion of x-level cell (XLC) blocks of the memory array, wherein x represents an integer greater than one.

14. The method of claim 13, wherein disabling the static cache or the dynamic cache is effective through an end of a Host Total Bytes Written (TBW) Spec for the memory device.

15. The method of claim 13, further comprising enabling one of the static cache or the dynamic cache responsive to a reduced trend in a determined workload of the hybrid cache.

16. The method of claim 13, further comprising receiving the data from a host external to the memory device.

17. The method of claim 13, wherein disabling the static cache or the dynamic cache comprises at least one of:
    disabling the static cache responsive to comparing PE cycles consumed by the static cache against a maximum threshold for the static cache; and
    disabling the dynamic cache responsive to comparing PE cycles consumed by the dynamic cache against a predetermined threshold for triggering a switch point defined as a point at which operating the hybrid cache solely with the static cache ensures PE cycles of x-level cell (XLC) blocks of the dynamic cache remain below their maximum within a Total Bytes Written (TBW) Spec for the memory device.

18. A system, comprising:
    a memory device including a memory array including static cache and dynamic cache;
    the memory device configured to completely disable the static cache of the memory array or the dynamic cache of the memory array to ensure a number of program/erase (PE) cycles associated with the static cache or the dynamic cache remains below a PE threshold;
    wherein the static cache includes single-level cell (SLC) blocks of the memory array of the memory device, and the dynamic cache and a main memory of the memory device share at least a portion of x-level cell (XLC) blocks of the memory array, wherein x represents an integer greater than one.

19. The system of claim 18, wherein the memory device is configured to write data received from a host device in at least one of main memory of the memory device, the static cache, or the dynamic cache.

* * * * *